US012566460B2

(12) United States Patent
Tsuno et al.

(10) Patent No.: US 12,566,460 B2
(45) Date of Patent: Mar. 3, 2026

(54) MANAGEMENT DEVICE, POSITIONING SYSTEM, AND MANAGEMENT METHOD

(71) Applicant: HONDA MOTOR CO., LTD., Tokyo (JP)

(72) Inventors: Koichi Tsuno, Saitama (JP); Tetsuya Matsuhisa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 111 days.

(21) Appl. No.: 18/397,592

(22) Filed: Dec. 27, 2023

(65) Prior Publication Data

US 2024/0219931 A1      Jul. 4, 2024

(30) Foreign Application Priority Data

Dec. 28, 2022    (JP) ................................. 2022-211884

(51) Int. Cl.
| | |
|---|---|
| *G05D 1/69* | (2024.01) |
| *G05D 1/248* | (2024.01) |
| *G05D 105/40* | (2024.01) |
| *G05D 109/10* | (2024.01) |
| *H04B 7/026* | (2017.01) |
| *H04B 7/155* | (2006.01) |
| *H04W 4/46* | (2018.01) |
| *H04W 88/08* | (2009.01) |

(52) U.S. Cl.
CPC .............. *G05D 1/69* (2024.01); *G05D 1/248* (2024.01); *H04B 7/026* (2013.01); *H04B 7/15507* (2013.01); *H04W 4/46* (2018.02); *H04W 88/08* (2013.01); *G05D 2105/40* (2024.01); *G05D 2109/10* (2024.01)

(58) Field of Classification Search
CPC ........ G05D 1/69; G05D 1/248; G05D 1/6987; G05D 2105/40; G05D 2105/28; G05D 2109/10; H04B 7/026; H04B 7/15507; H04W 4/46; H04W 88/08; G01S 19/04
See application file for complete search history.

(56) References Cited

U.S. PATENT DOCUMENTS 9,821,455 B1 * 11/2017 Bareddy ................ G06Q 10/06
2008/0284645 A1   11/2008 Terada et al.
(Continued)

FOREIGN PATENT DOCUMENTS

| | | |
|---|---|---|
| CN | 106658707 A | 5/2017 |
| JP | H09-061509 A | 3/1997 |

(Continued)

OTHER PUBLICATIONS

Apr. 2, 2024, Translation of Japanese Office Action issued for related JP Application No. 2022-211884.

*Primary Examiner* — Aaron L Troost
(74) *Attorney, Agent, or Firm* — Paratus Law Group, PLLC

(57)          ABSTRACT

A management device includes: a processor, and the processor specifies a first mobile machine that is not scheduled to operate during a predetermined period, based on data of operation plans of a plurality of mobile machines that are autonomously movable and have a function of a positioning base station, and transmits, to the first mobile machine, an instruction to operate the first mobile machine as the base station during the predetermined period.

9 Claims, 8 Drawing Sheets

(56) References Cited

U.S. PATENT DOCUMENTS

2022/0283313 A1*  9/2022  Lekutai ................... G08G 5/26
2022/0286998 A1*  9/2022  Dwivedi .............. H04W 64/00

FOREIGN PATENT DOCUMENTS

JP          2000-206222  A        7/2000
JP      WO2006/046298  A1        5/2006
JP          2016-146010  A        8/2016
JP          2017033121  A    *    2/2017
JP          2019-033323  A        2/2019

* cited by examiner

FIXED
BASE STATION

CORRECTION
SIGNAL SG1

CORRECTION
SIGNAL SG2

(DURING MOVEMENT)
CORRECTION SIGNAL SG1

(AFTER SURVEY IN)
CORRECTION SIGNAL SG2

MOVE

21

AUTONOMOUS MOBILE MACHINE
(OPERATION AS BASE STATION)

22

AUTONOMOUS MOBILE MACHINE

MANAGEMENT DEVICE, POSITIONING SYSTEM, AND MANAGEMENT METHOD

CROSS-REFERENCE TO RELATED APPLICATIONS

This application is based on and claims priority under 35 USC 119 from Japanese Patent Application No. 2022-211884 filed on Dec. 28, 2022, the entire content of which is incorporated herein by reference.

TECHNICAL FIELD

The present invention relates to a management device, a positioning system, and a management method.

BACKGROUND ART

A relative positioning method is a positioning method for acquiring a relative positional relationship between receivers based on signals from a plurality of satellites received by the plurality of receivers. For example, in a real time kinematic global navigation satellite system (RTK-GNSS), positioning is performed using a signal received from a satellite by a base station whose position is known and a mobile station whose position is not known.

The relative positioning method is expected to be applied to various industrial fields because positioning is high accuracy than a single positioning method such as a global positioning system (GPS).

JP2019-33323A discloses a base station device. The base station device includes an integrated unit in which a secondary battery, a power conversion unit that converts power supplied from the secondary battery, a communication unit that performs ad hoc communication with other devices, and a driving unit that autonomously moves the device itself are accommodated in a housing.

JP2016-146010A discloses an operation management system. The operation management system includes a plurality of transport vehicles that travel on a transport path connected to a work area and transport objects to be transported, a resident vehicle that is resident in the work area, a control system that manages the transport vehicles and the resident vehicle, and a wireless relay station that relays wireless communication performed between the transport vehicles and the control system. In the operation management system, a wireless communication device for performing wireless communication with each of the plurality of transport vehicles is disposed. The operation management system includes a wireless relay station in the resident vehicle, and determines a transport vehicle accessing the wireless relay station based on vehicle body information on the transport vehicle.

JP2017-033121A discloses a server device. The server device communicates with a plurality of autonomous traveling device provided with a wireless communication unit via a radio base station, and instructs an operation for each autonomous traveling device. The wireless communication unit of the autonomous traveling device has a relay function of relaying communication with another wireless communication unit provided in another autonomous traveling device different from the radio base station, and transmits position information of the autonomous traveling device and information on a reception strength of the wireless communication radio wave to the server device.

The server device includes a communication unit that transmits information indicating an operation to the autonomous traveling device based on the position information and the information on the reception strength so that one of the autonomous traveling devices reaches a destination using the relay function of the other autonomous traveling device when the destination is outside the wireless communication area by the radio base station.

SUMMARY OF INVENTION

Since buildings and trees on the ground may block signals from a satellite, accuracy of positioning and the size of an area in which positioning can be performed vary depending on a location where the base station is installed.

The present invention provides a management device, a positioning system, and a management method that enable positioning with high accuracy in a wider range.

According to the present invention, it is possible to perform the positioning with high accuracy in a wider range.

DESCRIPTION OF EMBODIMENTS

Hereinafter, the present embodiment will be described with reference to the accompanying drawings.

Figure 1:
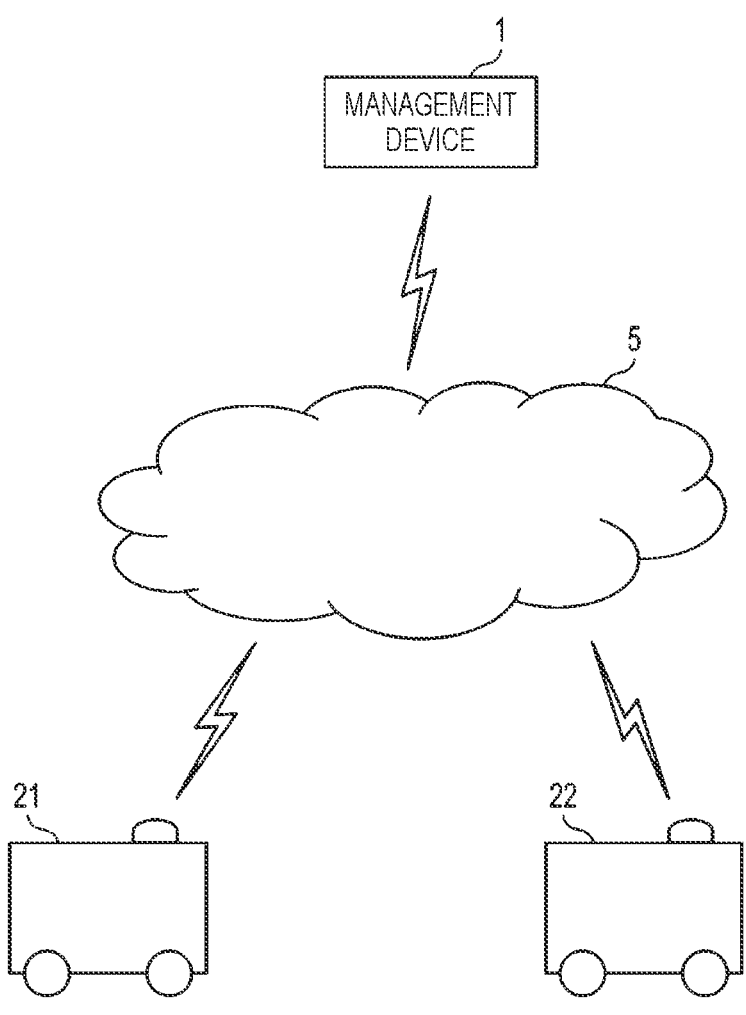
FIG. 1 is a diagram illustrating an overview of a system according to an embodiment.

FIG. 1 is a diagram illustrating an overview of a system according to the present embodiment. The system according to the present embodiment includes a management device 1 and one or more autonomous mobile machines (autonomous mobile machines 21 and 22 in an example of FIG. 1). The management device 1 and the autonomous mobile machines 21 and 22 can communicate with each other via a network 5 such as the Internet. In the example of FIG. 1, the number of autonomous mobile machines is two, but may be three or more. The autonomous mobile machines 21 and 22 move in order to carry a package, materials, equipment, and the like at a work place such as a construction site, a farm and a harbor.

The autonomous mobile machines 21 and 22 have an RTK-GNSS antenna, and the management device 1 can grasp positions of the autonomous mobile machines 21 and 22 using RTK-GNSS. A fixed base station of RTK-GNSS installed on the ground surface may be provided at a work place where the autonomous mobile machines 21 and 22 operate.

The management device 1 is a device that manages operations of the autonomous mobile machines 21 and 22. The management device 1 sets an operation mode in each of the autonomous mobile machines 21 and 22, and controls the autonomous mobile machines 21 and 22 to operate in accordance with the operation mode. In the present embodiment, the operation mode includes a base station mode and a mobile station mode. In the base station mode, the autonomous mobile machines 21 and 22 operate as base stations of RTK-GNSS. In the mobile station mode, the autonomous mobile machines 21 and 22 operate as mobile stations of RTK-GNSS. In addition, the management device 1 transmits a movement instruction including information such as a movement destination, a route to the movement destination, a movement start time, and a movement speed to the autonomous mobile machines 21 and 22, and moves the autonomous mobile machines 21 and 22.

The autonomous mobile machines 21 and 22 are moving bodies that are autonomously movable. The autonomous movement is a movement that does not depend on a human operation. The autonomous mobile machines 21 and 22 can move in accordance with a program installed in advance, and can also move in accordance with a movement instruction from the management device 1.

The autonomous mobile machines 21 and 22 in the base station mode stop moving when moving to a position designated by the management device 1, and operate as base stations of RTK-GNSS at the position. When the autonomous mobile machines 21 and 22 are neither in the mobile station mode nor in the base station mode, the autonomous mobile machines 21 and 22 stand by at a predetermined position of a work place, for example. The autonomous mobile machines 21 and 22 do not move during standby, and do not operate as a base station. The autonomous mobile machines 21 and 22 are charged during standby to prepare for start of the next operation according to a predetermined plan.

Figure 2:
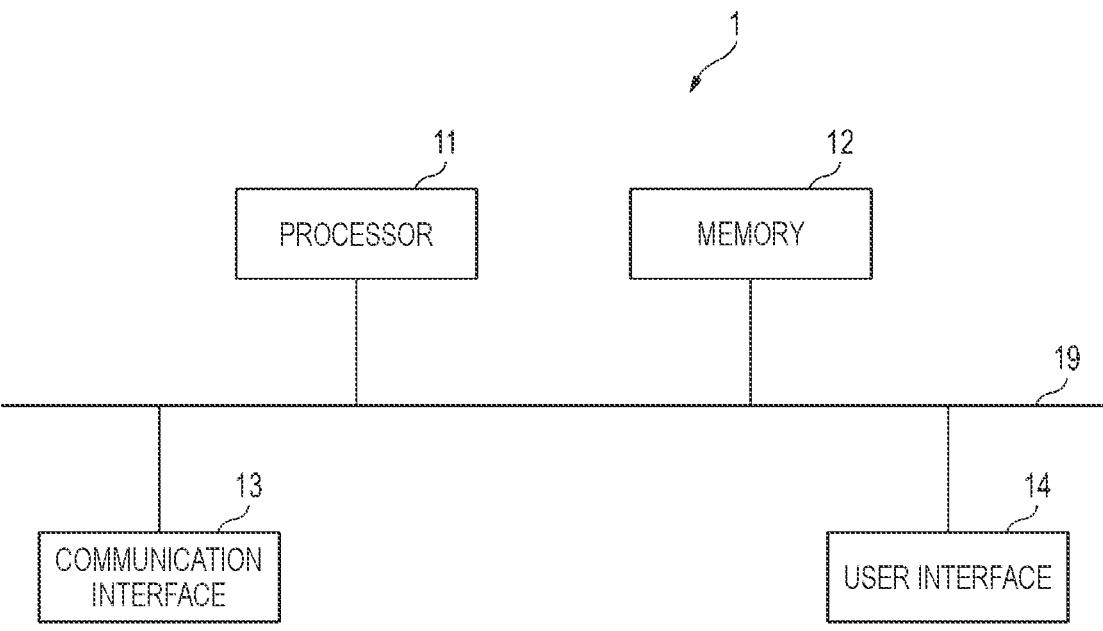
FIG. 2 is a diagram illustrating an example of a hardware configuration of a management device.

FIG. 2 is a diagram illustrating an example of a hardware configuration of the management device 1. The management device 1 includes a processor 11, a memory 12, a communication interface 13, and a user interface 14. The processor 11, the memory 12, the communication interface 13, and the user interface 14 are connected by, for example, a bus 19.

The processor 11 is a circuit that performs signal processing, and is, for example, a central processing unit (CPU) that performs an overall control of the management device 1. The processor 11 may be implemented by another digital circuit such as a field programmable gate array (FPGA) or a digital signal processor (DSP). In addition, the processor 11 may be realized by combining a plurality of digital circuits.

The memory 12 includes, for example, a main memory and an auxiliary memory. The main memory is, for example, a random access memory (RAM). The main memory is used as a work area of the processor 11.

The auxiliary memory is a non-transitory computer-readable storage medium, and is, for example, a non-volatile memory such as a magnetic disk, an optical disk, or a flash memory. Various program for operating the management device 1 are stored in the auxiliary memory. The program stored in the auxiliary memory is loaded into the main memory and executed by the processor 11.

The auxiliary memory may include a portable memory removable from the management device 1. The portable memory is, for example, a memory card such as a universal serial bus (USB) flash drive or a secure digital (SD) memory card, or an external hard disk drive.

The communication interface 13 is a communication interface that performs communication with the outside (for example, the autonomous mobile machines 21 and 22) of the management device 1. The communication interface 13 is controlled by the processor 11.

The user interface 14 includes, for example, an input device that receives an operation input from a user (for example, a person who operates the management device 1), an output device that outputs information, and the like. The input device is realized by, for example, a pointing device (for example, a mouse), a key (for example, a keyboard), a remote controller, or the like. The output device is realized by, for example, a display or a speaker. Further, both the input device and the output device may be realized by a touch panel or the like. The user interface 14 is controlled by the processor 11.

Figure 3:
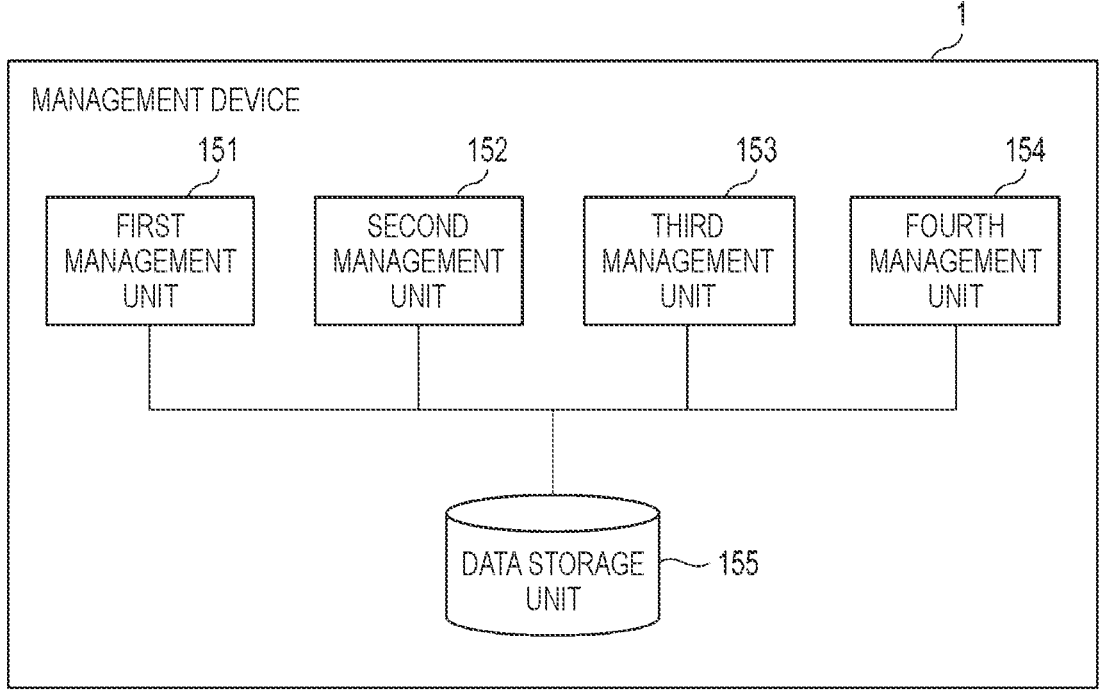
FIG. 3 is a diagram illustrating an example of a functional block diagram of the management device.

FIG. 3 is a diagram illustrating an example of a functional block diagram of the management device 1. In the management device 1, functions of a first management unit 151, a second management unit 152, a third management unit 153, and a fourth management unit 154 illustrated in FIG. 3 are realized by causing the processor 11 to execute a program (software). A data storage unit 155 is implemented in the memory 12.

Based on data stored in the data storage unit 155, the first management unit 151 executes a process of specifying an autonomous mobile machine operating in the base station mode and a process of specifying a candidate site that is a place w % here the autonomous mobile machine operates.

The second management unit 152 executes, for example, a process of managing arrangement of the autonomous mobile machines 21 and 22 based on the data stored in the data storage unit 155.

Based on the data stored in the data storage unit 155 and the data received from the autonomous mobile machines 21 and 22, the third management unit 153 executes a process of checking whether there is no problem in the candidate site as a place where the autonomous mobile machine in the base station mode operates.

The fourth management unit 154 executes, for example, a process of changing the autonomous mobile machine based on the data stored in the data storage unit 155.

The data storage unit 155 stores point cloud data of a work place, data of a list of autonomous mobile machines to be managed, data of an operation plan of each autonomous mobile machine, data for specifying a battery residual capacity of each autonomous mobile machine, data indicating a state of each autonomous mobile machine (for example, in the base station mode, in the mobile station mode, or during standby), and the like.

Figure 4:
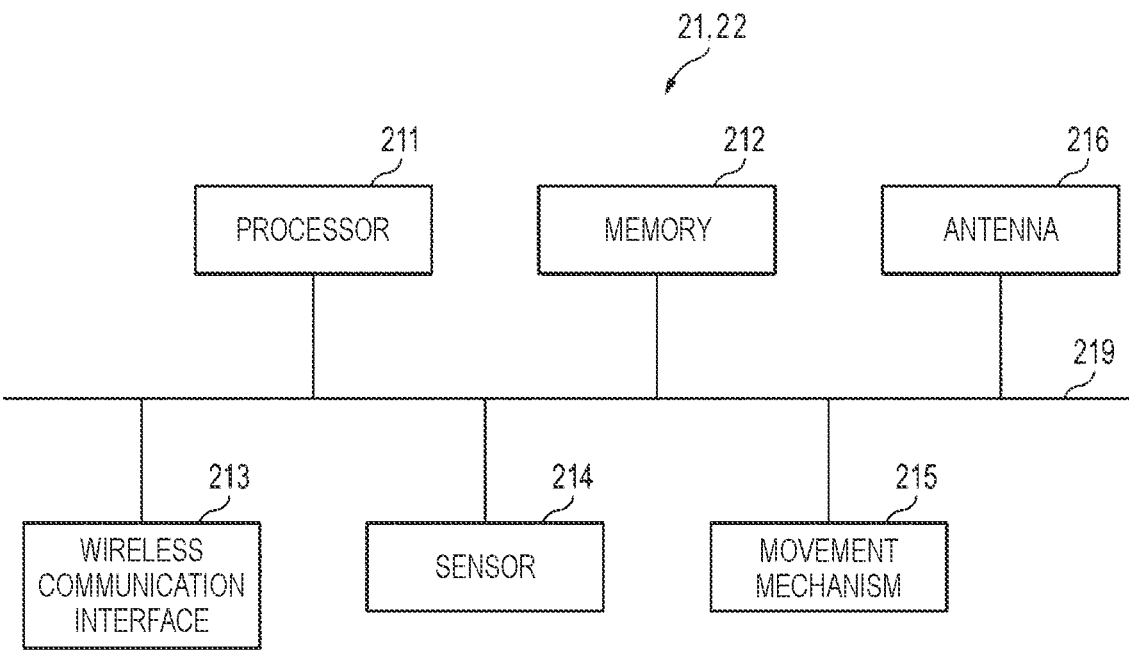
FIG. 4 is a diagram illustrating an example of a hardware configuration of an autonomous mobile machine.

FIG. 4 is a diagram illustrating an example of a hardware configuration of each of the autonomous mobile machines 21 and 22. The autonomous mobile machines 21 and 22 each include a processor 211, a memory 212, a wireless communication interface 213, a sensor 214, and a movement mechanism 215. The processor 211, the memory 212, the wireless communication interface 213, the sensor 214, the movement mechanism 215, and the antenna are connected by, for example, a bus 219.

The processor 211 and the memory 212 of each of the autonomous mobile machines 21 and 22 have the same configuration as the processor 1I and the memory 12 of the management device 1, respectively.

The wireless communication interface 213 is a communication interface that performs wireless communication with the outside (for example, the management device 1) of the autonomous mobile machines 21 and 22. The wireless communication interface 213 is controlled by the processor 211.

The sensor 214 includes various sensor capable of acquiring information on a moving state of each of the autonomous mobile machines 21 and 22, external information, and the like.

The sensor 214 is controlled by the processor 11, and sensing data of the sensor 214 is acquired by the processor 11.

The sensor 214 includes, for example, a camera, a light detection and ranging (LiDAR) sensor, a wheel encoder, and an inertial measurement unit (IMU).

The camera is a sensor for acquiring image data. The LiDAR sensor is a three-dimensional sensor for three-dimensionally recognizing the outside of the autonomous mobile machines 21 and 22. Specifically, the LiDAR sensor emits a laser beam to measure time until the emitted laser beam hits an object and bounces back and measure a distance and direction to the object. The LiDAR sensor is provided, for example, so as to be able to sense the front of each of the autonomous mobile machines 21 and 22. A plurality of LiDAR sensors may be provided so as to be able to sense a plurality of directions. The LiDAR sensor may be able to perform swinging (panning, tilting), zooming, or the like. The wheel encoder is a sensor that measures a rotation speed of a wheel (wheel speed), and can acquire a vehicle speed of each of the autonomous mobile machines 21 and 22 from a measurement result by the wheel encoder. The IMU is a sensor that measures accelerations in a front-rear direction, a left-right direction, and an upper-lower direction of each of the autonomous mobile machines 21 and 22, and angular velocities in a pitch direction, a roll direction, and a yaw direction.

The movement mechanism 215 is a mechanism for each of the autonomous mobile machines 21 and 22 to autonomously move. The movement mechanism 215 is, for example, a wheel or a leg for walking. The movement mechanism 215 is controlled by the processor 211. In the following example, it is assumed that the movement mechanism 215 is a wheel. Although not illustrated, each of the autonomous mobile machines 21 and 22 include an actuator such as a motor unit, and move by driving the movement mechanism 215 by the actuator.

The antenna 216 is an antenna for transmitting and receiving signals to and from the RTK-GNSS. A communication module (not illustrated) receives a signal transmitted from an artificial satellite via the antenna 216, and the communication module can calculate position information. The calculated position information is processed by the processor 211, or is transmitted to the management device 1 via the wireless communication interface 213.

Figure 5:
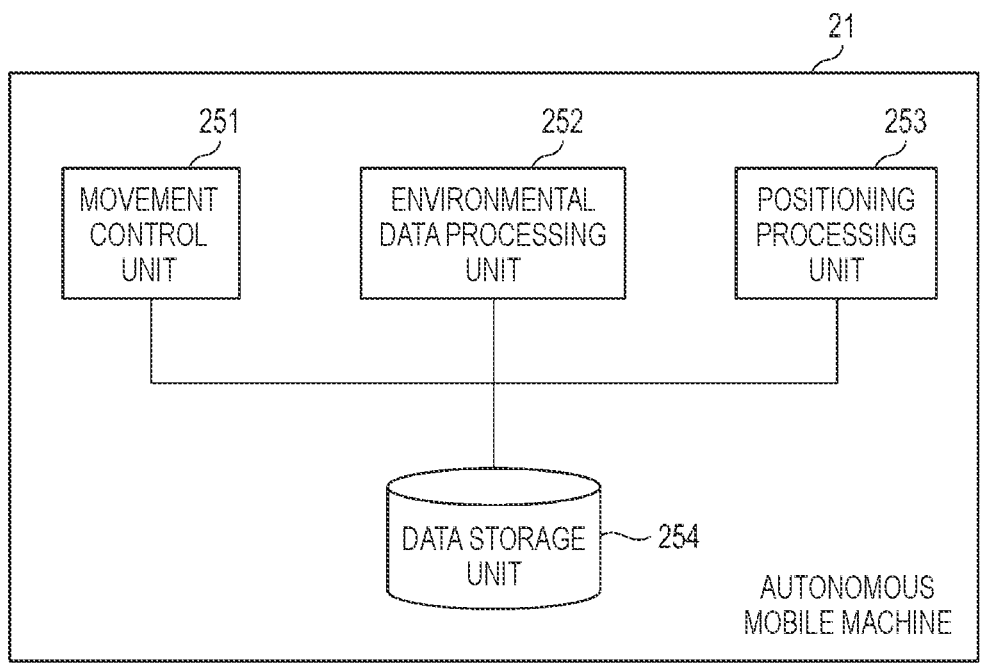
FIG. 5 is a diagram illustrating an example of a functional block diagram of the autonomous mobile machine.

FIG. 5 is a diagram illustrating an example of a functional block diagram of each of the autonomous mobile machines 21 and 22. In the autonomous mobile machines 21 and 22, various functions illustrated in FIG. 5 are realized when a program (software) is executed by the processor 211.

A movement control unit 251 executes a process of controlling a movement of each of the autonomous mobile machines 21 and 22 based on the data stored in a data storage unit 254.

An environmental data processing unit 252 executes a process of transmitting data acquired by the sensor 214, which is stored in the data storage unit 254, to the management device 1.

A positioning processing unit 253 executes a process of positioning RTK-GNSS based on the data stored in the data storage unit 254.

The data storage unit 254 stores information on a work task, information on a mode of the own device, data acquired by the sensor 214, and the like.

Figure 6:
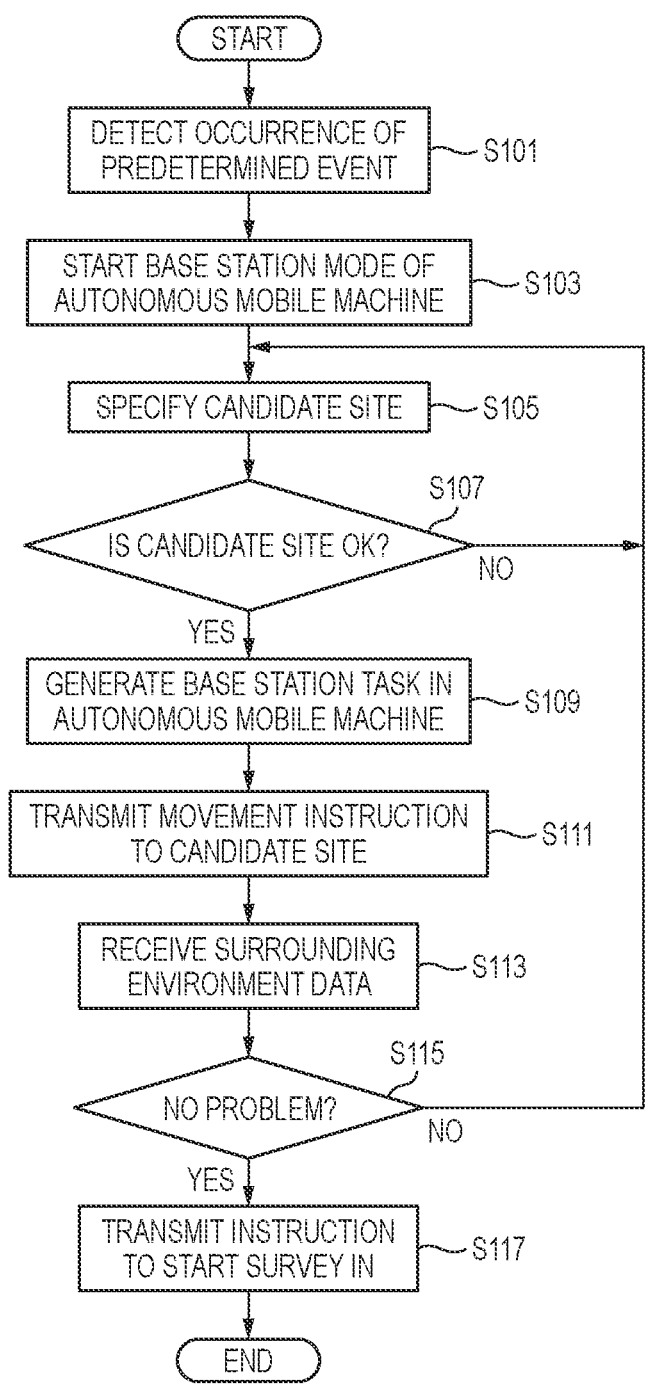
FIG. 6 is a diagram illustrating a flow of a process of operating an unused autonomous mobile machine as a base station.

FIG. 6 is a diagram illustrating a flow of a process of operating the autonomous mobile machine during standby as a base station. The first management unit 151 of the management device 1 detects occurrence of a predetermined event (step S101). The predetermined event is, for example, (1) an event in which a work task outside an area cover by the base station is set. (2) an event in which the base station goes down (that is, the base station cannot operate), or (3) an event in which an instruction to perform operation without installing a fixed base station is input from the user. Based on the occurrence of the predetermined event, the first management unit 151 of the management device 1 can grasp an area and a period in which the autonomous mobile machine is to be operated as the base station. The work task is, for example, a task of delivering an object.

Based on the data of the operation plan stored in the data storage unit 155, the first management unit 151 of the management device 1 specifies one autonomous mobile machine that is on standby (that is, that is not scheduled to operate) during a target period. Here, it is assumed that the specified autonomous mobile machine is the autonomous mobile machine 21. Then, the first management unit 151 of the management device 1 causes the specified autonomous mobile machine 21 to start the base station mode (step S103). Specifically, the first management unit 151 of the management device 1 transmits an instruction to start the base station mode to the autonomous mobile machine 21, and the autonomous mobile machine 21 starts the base station mode accordingly.

Figure 7:
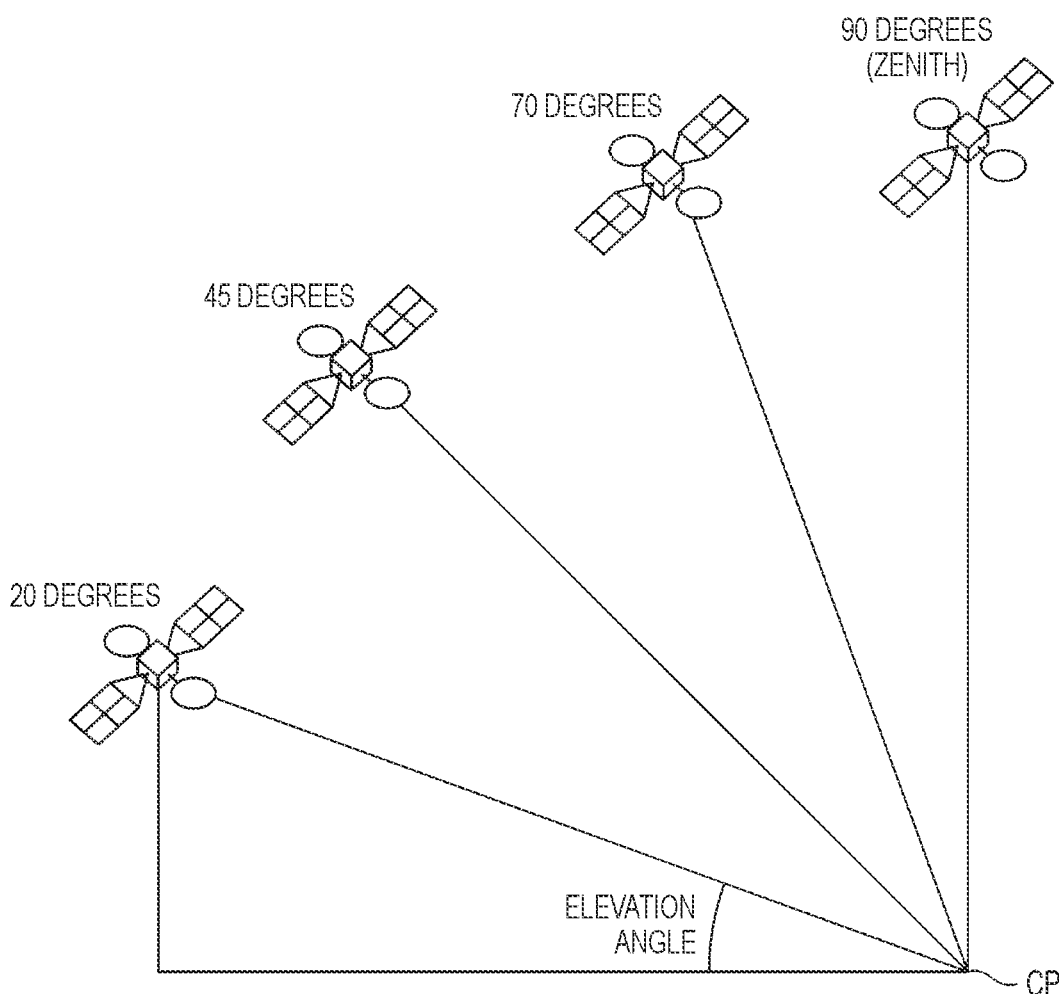
FIG. 7 is a diagram illustrating a relationship between a position of an antenna and a position of a satellite.

Based on the point cloud data stored in the data storage unit 155, the first management unit 151 of the management device 1 specifies one candidate of the place where the autonomous mobile machine 21 specified in step S103 operates as the base station from the work place (step S105). In step S105, for example, a place where an obstacle does not block a signal from the satellite to the autonomous mobile machine 21 and is not on a moving route of the other autonomous mobile machine is specified. In specifying a place where the obstacle does not block the signal from the satellite to the autonomous mobile machine 21, an elevation angle is considered as one example. FIG. 7 is a diagram illustrating a relationship between a position CP of the antenna of the autonomous mobile machine 21 and a position of the satellite. For example, a place where there is no or relatively few obstacles such as buildings and trees at an elevation angle of 30 degrees or more around the position CP of the antenna is specified. In this case, for example, the condition may be that the number of obstacles having a predetermined elevation angle of 360 degrees or more around the position CP of the antenna is equal to or less than a predetermined number, or that an area (volume) occupied by the obstacles having a predetermined elevation angle of 360 degrees or more around the position CP of the antenna is equal to or less than a predetermined value. An elevation angle of 15 degrees or more may be used as a more strict criterion. Alternatively, heights (meters) of obstacles within a predetermined radius of the autonomous mobile machine 21 may be taken into consideration instead of or additionally.

The first management unit 151 of the management device 1 presents the candidate site specified in step S105 to the user. Then, the first management unit 151 of the management device 1 determines whether OK is input from the user (that is, whether the user has approved the specified candidate site) (step S107). In a case where the user cannot input OK to the management device 1, or in a case where the user inputs in advance that the process of step S107 may be skipped, the process of step S107 may be skipped.

When OK is not input from the user (step S107: No), the first management unit 151 of the management device 1 returns the process to step S105 in order to specify another candidate site. On the other hand, when the user inputs OK (step S107: Yes), the process proceeds to step S109. When the candidate site is re-specified, the user may manually input the candidate site.

The second management unit 152 of the management device 1 generates a base station task of the autonomous mobile machine 21 (step S109). The base station task is a task related to an operation of the autonomous mobile machine 21 as a base station, and includes, for example, information on a latitude and a longitude of the candidate site specified in step S105.

The second management unit 152 of the management device 1 transmits, to the autonomous mobile machine 21, the movement instruction to the candidate site specified in step S105 (step S111). The movement instruction includes information on the base station task generated in step S109. Upon receiving the movement instruction, the movement control unit 251 of the autonomous mobile machine 21 moves the autonomous mobile machine 21 to the candidate site by the movement mechanism 215.

Figure 8:
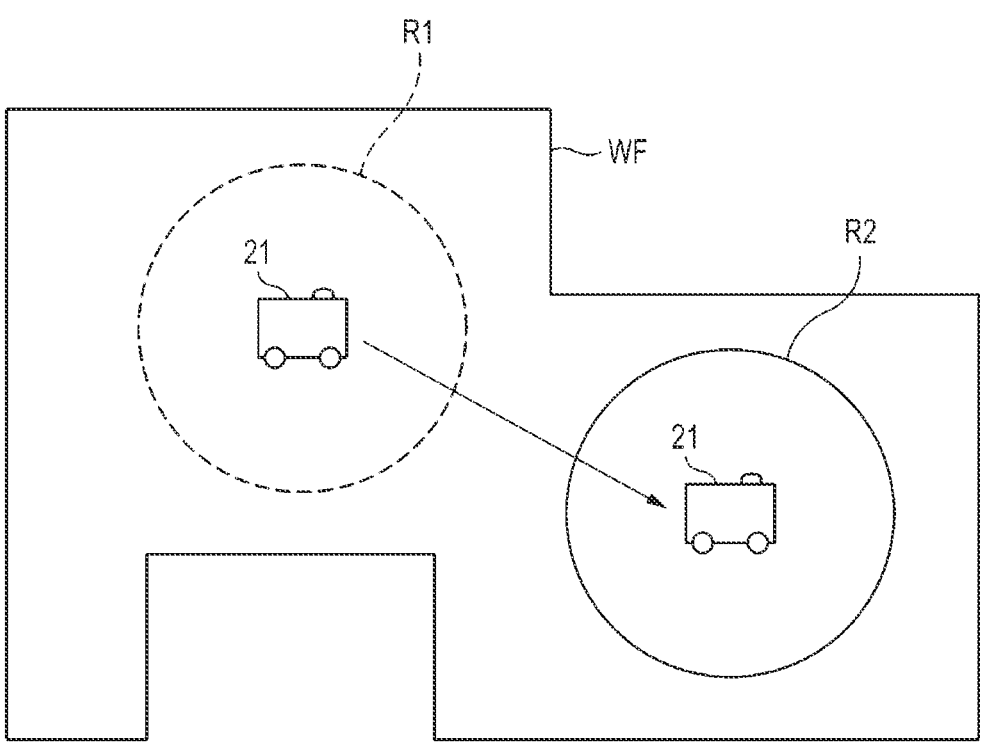
FIG. 8 is a diagram illustrating a movement of the autonomous mobile machine.

FIG. 8 is a diagram illustrating the movement of the autonomous mobile machine 21. In FIG. 8, the autonomous mobile machine 21 moves in a work place WF. Although an area that can be covered when the autonomous mobile machine 21 operates as the base station before the movement is an area R1, an area R2 can be covered when the autonomous mobile machine 21 operates as the base station after the movement. Accordingly, another autonomous mobile machine (for example, the autonomous mobile machine 22) can execute the work task in the area R2. As described above, in the present embodiment, when it is necessary to execute the work task according to the autonomous mobile machine at a specific place during the target period (several hours, one day, one week, or the like), the autonomous mobile machine 21 operating as the base station is moved so as to cover the place.

When the autonomous mobile machine 21 moves to the candidate site, the environmental data processing unit 252 of the autonomous mobile machine 21 acquires data of the environment around the autonomous mobile machine 21 (hereinafter referred to as surrounding environment data). The surrounding environment data includes, for example, image data acquired by the camera and data acquired by the LiDAR. The environmental data processing unit 252 of the autonomous mobile machine 21 transmits the acquired surrounding environment data to the management device 1, and the third management unit 153 of the management device 1 receives the surrounding environment data (step S113).

The third management unit 153 of the management device 1 determines whether there is no problem in the surrounding environment based on the received surrounding environment data (step S115). When there is a problem in the surrounding environment (for example, there is an obstacle around a periphery) (step S115: No), the process returns to step S105. When the candidate site is re-specified, the user may manually input the candidate site. Although the candidate site is specified using the point cloud data in the process of step S105, there may be an obstacle not reflected in the point cloud data or there may be another problem in the surrounding environment, and thus the process of step S115 is executed. In addition to the process of step S115, a process of checking a reception state of the RTK-GNSS signal may be executed.

On the other hand, when there is no problem in the surrounding environment (step S115: Yes), the third management unit 153 of the management device 1 transmits an instruction to start survey in to the autonomous mobile machine 21 (step S117).

Figure 9:
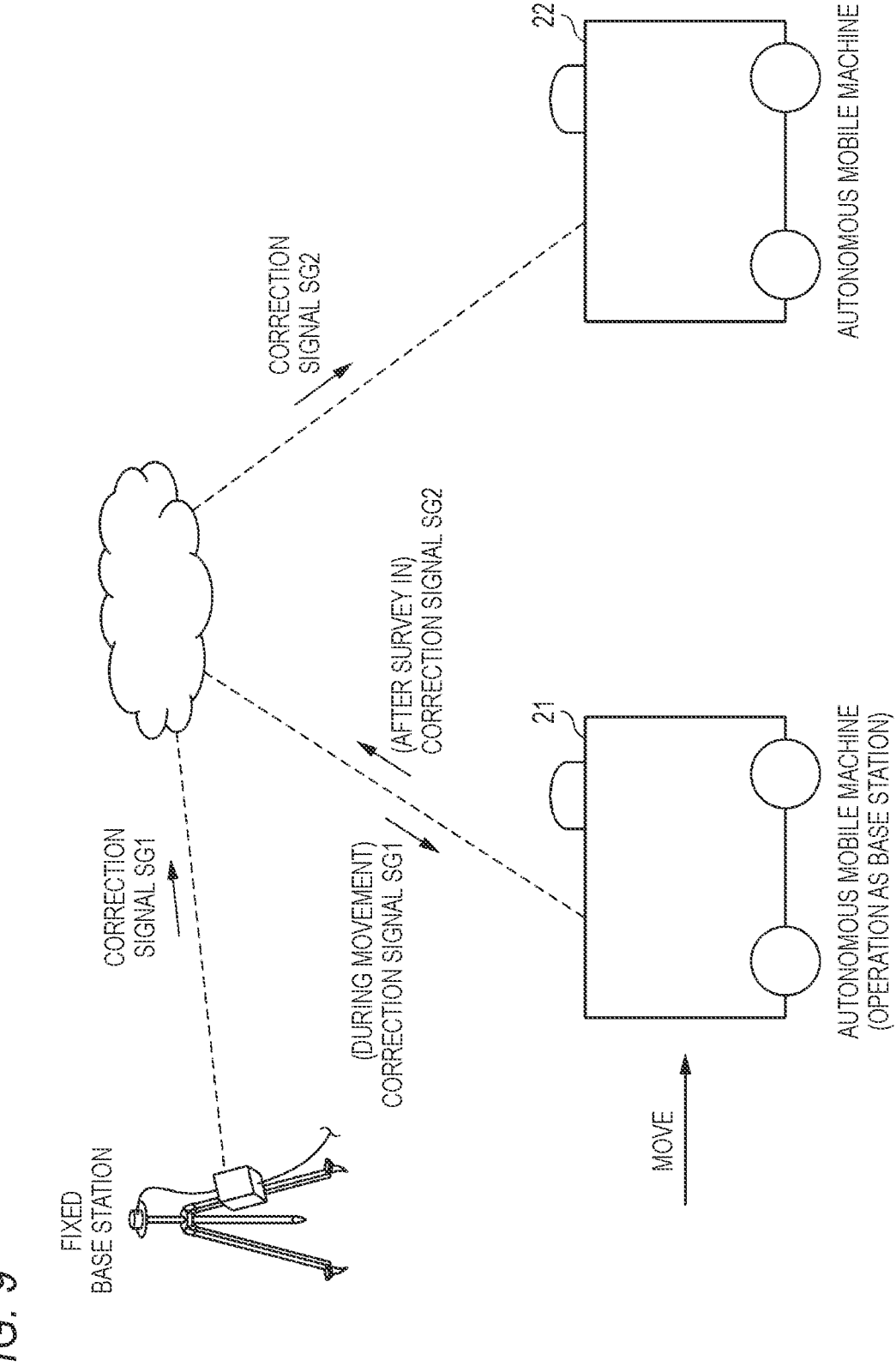
FIG. 9 is a diagram illustrating an outline of positioning in the present embodiment.

Upon receiving the instruction to start survey in, the positioning processing unit 253 of the autonomous mobile machine 21 starts survey in and executes another process for starting the operation with the base station. FIG. 9 is a diagram illustrating an outline of positioning in the present embodiment. An example of FIG. 9 illustrates a case where the work task executed by the autonomous mobile machine 22 is set outside the area cover by the fixed base station. The autonomous mobile machine 22 operates in the mobile station mode. If the work task is set in the area cover by the fixed base station, the position of the autonomous mobile machine 22 can be specified using a correction signal SG1 issued by the fixed base station. However, when the work task is not set in the area covered by the fixed base station, the position of the autonomous mobile machine 22 cannot be specified.

In the present embodiment, the autonomous mobile machine 21 moves such that the autonomous mobile machine 21 operates as the base station of the autonomous mobile machine 22. When the autonomous mobile machine 21 moves, the position of the autonomous mobile machine 21 can be specified using the correction signal SG1 generated by the fixed base station. When the autonomous mobile machine 21 starts an operation as the base station after moving, the autonomous mobile machine 21 issues a correction signal SG2. The position of the autonomous mobile machine 22 can be accurately specified using the correction signal SG2. Accordingly, it is possible to realize a safe operation and a remote control in the work place by the position information with high accuracy.

A workable area can be dynamically enlarged according to the need for work.

Although the installation of the fixed base station requires a relatively large cost, the cost can be reduced by operating the autonomous mobile machine 21 as the base station. Further, the cost for maintenance can also be reduced.

Figure 10:
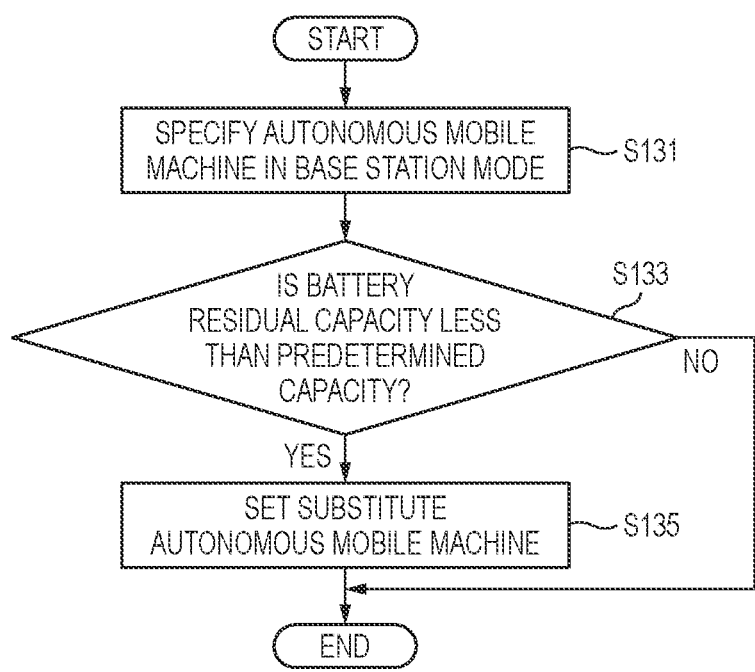
FIG. 10 is a diagram illustrating a flow of a process of changing the autonomous mobile machine.

FIG. 10 is a diagram illustrating a processing flow of the process of changing the autonomous mobile machine. The process of this flow is executed every time a predetermined time elapses, for example. Based on the mode management data stored in the data storage unit 155, the fourth management unit 154 of the management device 1 specifies an autonomous mobile machine that is in the base station mode (that is, operating as the base station) in the work place (step S131).

The fourth management unit 154 of the management device 1 determines whether the specified battery residual capacity of the autonomous mobile machine is less than a predetermined capacity (step S133). The information on the battery residual capacity may be periodically provided from the autonomous mobile machine, or may be calculated based on the residual capacity at the start of the base station mode and the time elapsed from the start.

When the battery residual capacity is not less than the predetermined capacity (step S133: No), since it is not necessary to change a work machine, the process ends. On the other hand, when the battery residual capacity is less than the predetermined capacity (step S133: Yes), the fourth management unit 154 of the management device 1 sets an autonomous mobile machine operating as the base station instead of the specified autonomous mobile machine (step S135). In step S135, for example, a base station task of the autonomous mobile machine that is on standby during the remaining period of the target period (that is, that is not scheduled to operate) is generated, and the movement instruction to a place where the autonomous mobile machine specified in step S131 is present is transmitted. On the other hand, the autonomous mobile machine specified in step S131 is instructed to end the base station mode after arrival of the substitute autonomous mobile machine and stands by at a predetermined place.

By performing the processes described above, even in a case where an autonomous mobile machine having a battery restriction is used as the base station, it is possible to prevent the base station from stopping operation during execution of the work task. Although the example in which the autonomous working machine in the base station mode is changed is illustrated here, an autonomous working machine in the mobile station mode may be changed by the same process.

Although various embodiments have been described above with reference to the drawings, the present invention is not limited thereto. It is apparent to those skilled in the art that various changes and modifications can be conceived within the scope of the claims, and it should be understood that those skilled in the art naturally belong to the technical scope of the present invention. In addition, constituent elements in the embodiment described above may be freely combined without departing from the gist of the present invention.

Note that the positioning method is not limited to RTK-GNSS. It is also possible to use another relative positioning method using a base station (or a reference point).

In the present specification, at least the following matters are described. In the parentheses, the corresponding constituent elements and the like are illustrated in the above embodiment, but the present invention is not limited thereto.

(1) A management device (management device 1) including:
a processor (processor 11),
wherein the processor
specifies a first mobile machine that is not scheduled to operate during a specific period, based on data of operation plans of a plurality of mobile machines that are autonomously movable and have a function of a positioning base station (step S103), and
transmits, to the first mobile machine, an instruction to operate the first mobile machine as the base station during the specific period (step S111).

According to (1), since the mobile machine that is not scheduled to operate operates as the base station, an area in which positioning can be performed can be set more flexibly. Accordingly, it is possible to perform positioning with high accuracy in a wider range.

(2) The management device according to (1),
wherein the processor specifies a first position that satisfies a first condition, based on data of an area in which the plurality of mobile machines operate, and
wherein the instruction includes a movement instruction to the first position.

In the area where the plurality of mobile machines operate, there is a possibility that there is a position that is not suitable for the arrangement of the base station. According to (2), the mobile machine can be moved to a place suitable for the arrangement of the base station.

(3) The management device according to (2),
wherein the first condition includes at least one of a condition on an elevation angle between an object around the first position and the first mobile machine and a condition on a height of the object.

According to (3), since it is possible to select a position where a signal exchanged with a satellite is not easily blocked, it is possible to perform the positioning with high accuracy in a wider range.

(4) The management device according to (3),
wherein the object around the first position is a building.

(5) The management device according to any one of (2) to (4),
wherein the processor receives data of a surrounding environment of the first position from the first mobile machine moved to the first position, and
wherein when the data of the surrounding environment satisfies a second condition, the processor specifies a second position that satisfies the first condition and is different from the first position, based on the data of the area in which the plurality of mobile machines operate.

It may be determined that the first position is not suitable for the arrangement of the base station when the first mobile machine actually moves to the first position. According to (5), when it is determined that the first position is not suitable for the arrangement of the base station, the first mobile machine can be moved to the second position different from the first position.

(6) The management device according to (1),
wherein the processor determines whether a residual capacity of a battery of the first mobile machine is less than a predetermined capacity, and specifies a second mobile machine that is not scheduled to operate during a remaining period of the specific period when the residual capacity is less than the predetermined capacity.

According to (6), the next mobile machine can be arranged before the mobile machine operating as the base station stops.

(7) The management device according to (1),
wherein the positioning is a real time kinematic global navigation satellite system (RTK-GNSS).

According to (7), it is possible to perform the positioning of RTK-GNSS with high accuracy in a wide range.

(8) A positioning system including:
the management device according to (1); and
the plurality of mobile machines according to (1).

(9) A management method executed by a computer, the management method including:
specifying a first mobile machine that is not scheduled to operate during a specific period, based on data of operation plans of a plurality of mobile machines that are autonomously movable and have a function of a positioning base station; and
transmitting, to the first mobile machine, an instruction to operate the first mobile machine as the base station during the specific period.

According to (9), since the mobile machine that is not scheduled to operate operates as the base station, an area in which positioning can be performed can be set more flexibly. Accordingly, it is possible to perform positioning with high accuracy in a wider range.

What is claimed is:
1. A management device comprising:
a processor, wherein the processor specifies a first mobile machine that is not scheduled to operate during a predetermined period, based on data of operation plans of a plurality of mobile machines that are autonomously movable and have a function of a positioning base station, specifies a first position that satisfies a first condition, based on data of an area in which the plurality of mobile machines operate, and transmits, to the first mobile machine, an instruction to operate the first mobile machine as the base station during the predetermined period, the instruction including a movement instruction to the first position, wherein the processor receives data of a surrounding environment of the first position from the first mobile machine moved to the first position, and when the data of the surrounding environment satisfies a second condition, the processor specifies a second position that satisfies the first condition and is different from the first position, based on the data of the area in which the plurality of mobile machines operate.

2. The management device according to claim 1, wherein the processor determines whether a residual capacity of a battery of the first mobile machine is less than a predetermined capacity, and specifies a second mobile machine that is not scheduled to operate during a remaining period of the predetermined period when the residual capacity is less than the predetermined capacity.

3. The management device according to claim 1, wherein the positioning is a real time kinematic global navigation satellite system (RTK-GNSS).

4. A positioning system comprising:

a plurality of mobile machines; and a management device comprising a processor, wherein the processor specifies a first mobile machine that is not scheduled to operate during a predetermined period, based on data of operation plans of the plurality of mobile machines that are autonomously movable and have a function of a positioning base station, and transmits, to the first mobile machine, an instruction to operate the first mobile machine as the base station during the predetermined period.

5. The management device according to claim 1, wherein the first condition includes at least one of a condition on an elevation angle between an object around the first position and the first mobile machine and a condition on a height of the object.

6. The management device according to claim 5, wherein the object around the first position is a building.

7. A management method executed by a computer, the management method comprising:

specifying a first mobile machine that is not scheduled to operate during a predetermined period, based on data of operation plans of a plurality of mobile machines that are autonomously movable and have a function of a positioning base station;

specifying a first position that satisfies a first condition, based on data of an area in which the plurality of mobile machines operate; and transmitting, to the first mobile machine, an instruction to operate the first mobile machine as the base station during the predetermined period, the instruction including a movement instruction to the first position, wherein the management method executed by the computer comprises:

receiving data of a surrounding environment of the first position from the first mobile machine moved to the first position; and when the data of the surrounding environment satisfies a second condition, specifying a second position that satisfies the first condition and is different from the first position, based on the data of the area in which the plurality of mobile machines operate.

8. A management system comprising:

a plurality of autonomous mobile machines; and an information processing device, wherein each of the plurality of autonomous mobile machines comprises:

an autonomous movement controller that controls autonomous movement of the each of the plurality of autonomous mobile machines; and a receiver that receives a signal from a satellite in a satellite positioning system, and wherein the information processing device is configured to:

specify a first autonomous mobile machine that is not scheduled to operate during a predetermined period, based on data of operation plans of the plurality of autonomous mobile machines; and transmit, to the first autonomous mobile machine, an instruction to move the first autonomous mobile machine to a predetermined geographical location and make the first autonomous mobile machine to conduct survey-in operation at the predetermined geographical location.

9. A management system comprising:

a plurality of autonomous mobile machines; and an information processing device, wherein each of the plurality of autonomous mobile machines comprises:

an autonomous movement controller that controls autonomous movement of the each of the plurality of autonomous mobile machines; and a receiver that receives a signal from a satellite in a satellite positioning system, and wherein the information processing device is configured to:

specify a first autonomous mobile machine that is not scheduled to operate during a predetermined period, based on data of operation plans of the plurality of autonomous mobile machines;

transmit, to the first autonomous mobile machine, an instruction to move the first autonomous mobile machine to a predetermined geographical location; and when a residual capacity of a battery of the first autonomous mobile machine becomes less than a predetermined capacity at the predetermined geographical location, transmit, to a second autonomous mobile machine different from the first autonomous mobile machine, an instruction to move the second autonomous mobile machine to the predetermined geographical location.

* * * * *